(12) United States Patent
Yamabe et al.

(10) Patent No.: US 9,794,111 B2
(45) Date of Patent: Oct. 17, 2017

(54) COMMUNICATION SYSTEM, VIRTUAL NETWORK MANAGEMENT APPARATUS, VIRTUAL NETWORK MANAGEMENT METHOD AND PROGRAM

(71) Applicant: NEC Corporation, Tokyo (JP)

(72) Inventors: Tomohisa Yamabe, Tokyo (JP); Masaharu Morimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 254 days.

(21) Appl. No.: 14/433,015

(22) PCT Filed: Oct. 4, 2013

(86) PCT No.: PCT/JP2013/077040
§ 371 (c)(1),
(2) Date: Apr. 1, 2015

(87) PCT Pub. No.: WO2014/054768
PCT Pub. Date: Apr. 10, 2014

(65) Prior Publication Data
US 2015/0249565 A1    Sep. 3, 2015

(30) Foreign Application Priority Data

Oct. 5, 2012  (JP) ................................ 2012-223123

(51) Int. Cl.
*H04L 12/24* (2006.01)
*H04L 12/721* (2013.01)
(Continued)

(52) U.S. Cl.
CPC ............ *H04L 41/044* (2013.01); *H04L 41/28* (2013.01); *H04L 45/38* (2013.01); *H04L 47/35* (2013.01);
(Continued)

(58) Field of Classification Search
None
See application file for complete search history.

(56) References Cited

U.S. PATENT DOCUMENTS 6,047,320 A     4/2000  Tezuka et al.
6,789,090 B1 *  9/2004  Miyake ............... H04L 41/0213
                                                         707/959
(Continued)

FOREIGN PATENT DOCUMENTS

CN        101217398 A      9/2008
CN        102263667 A      11/2011
(Continued)

OTHER PUBLICATIONS

Y. Zhang et al., "Layer-Based Access Control Model in the Manufacturing Infrastructure and Design Automation System", Information Security and Cryptology—ICISC 2003, pp. 197-214, May 2004.

(Continued)

*Primary Examiner* — Hassan Phillips
*Assistant Examiner* — Saba Tsegaye
(74) *Attorney, Agent, or Firm* — Finnegan, Henderson, Farabow, Garrett & Dunner, L.L.P.

(57) ABSTRACT

A communication system includes: a network configuration memory that stores network configuration information of a first layer in which an area of the first layer whose low level configuration is desired to be concealed is represented by a preset symbol and that also stores network configuration information of a second layer showing the area represented by the preset symbol. The system also includes a network configuration management section that allows a first user to manage a network of the first layer using the network configuration information of the first layer and that also allows a second user to manage a network of the second (Continued)

layer using at least the network configuration information of the second layer.

15 Claims, 15 Drawing Sheets

(51) Int. Cl.
  *H04L 12/801* (2013.01)
  *H04L 29/06* (2006.01)
(52) U.S. Cl.
  CPC .............. *H04L 63/10* (2013.01); *H04L 63/20* (2013.01); *H04L 41/0803* (2013.01)

(56) References Cited

U.S. PATENT DOCUMENTS

| | | | |
|---|---|---|---|
| 7,570,638 | B2 | 8/2009 | Shimizu et al. |
| 8,856,174 | B2 | 10/2014 | Fueta et al. |
| 2005/0021691 | A1* | 1/2005 | Ueno ................. H04L 41/0816 709/220 |
| 2006/0098649 | A1 | 5/2006 | Shay |
| 2006/0262786 | A1 | 11/2006 | Shimizu et al. |
| 2012/0089707 | A1* | 4/2012 | Baba .................... H04L 41/022 709/220 |
| 2012/0158938 | A1 | 6/2012 | Shimonishi et al. |
| 2012/0331004 | A1 | 12/2012 | Fueta et al. |

FOREIGN PATENT DOCUMENTS

| | | |
|---|---|---|
| EP | 2 461 248 A1 | 6/2012 |
| JP | 06-326706 A | 11/1994 |
| JP | 10-145364 A | 5/1998 |
| JP | 2005-203984 A | 7/2005 |
| JP | 2006-324910 A | 11/2006 |
| WO | WO 2011/114389 A1 | 9/2011 |
| WO | WO 2012/133060 A1 | 10/2012 |

OTHER PUBLICATIONS

International Search Report (ISR) (PCT Form PCT/ISA/210), in PCT/JP2013/077040, dated Jan. 7, 2014.
Nick McKeown, et. al., "OpenFlow: Enabling Innovation in Campus Networks," [online], [searched on May 31, 2012], the Internet <URL: http://www.openflow.org/documents/openflow-wp-latest/pdf>.
"OpenFlow Switch Specification" Version 1.1.0 Implemented (Wire Protocol 0x02), [online], [searched on May 31, 2012], the Internet <URL:http://www.openflow.org/documents/openflow-spec-v1.1.0.pdf>.
Das, S. et al., "Why Open Flow/SDN Can Succeed Where GMPLS Failed," ECOC Technical Disgest, Sep. 16, 2012, [retrieved on Dec. 19, 2013]. Retrieved from the Internet: <URL: http://yuba.stanford.edu/~nickm/papers/ECEOC-2012-Tu.1.D.1.pdf>.
Y. Zhang et al., "Layer-Based Access Control Model in the Manufacturing Infrastructure and Design Automation System", Information Security and Cryptology—ICISC 2003, May 2004.
Extended European Search Report mailed May 20, 2016 by the European Patent Office in counterpart European Patent Application No. 13843992.2.
Notification of the First Office Action dated Mar. 20, 2017 from the Patent Office of the People's Republic of China in counterpart Chinese Patent Application No. 201380052113.X.

* cited by examiner

FIG. 9
PHYSICAL NETWORK CONFIGURATION INFORMATION

```
controller-list {
  controller pfc1 {
    ip address 192.168.0.11/24 }
  controller hvc1 {
    ip address 192.168.0.12/24 }} domain-list {
  domain dom1 controller pfc1 {
    swid 0001 port P1
    swid 0001 port P2
    swid 0002 port P1 }
  domain dom2 controller pfc1 {
    swid 0003 port P1
    swid 0003 port P2
    swid 0004 port P1 }
  domain dom3 controller hvc1 {
    swid 0001 port P1
    swid 0001 port P2 }
  domain dom4 controller hvc1 {
    swid 0002 port P1
    swid 0002 port P2 }
  domain dom5 controller hvc1 {
    swid 0003 port P1
    swid 0003 port P2 }}
```

```
boundary-list {
  boundary b1 {
    link controller hvc1 swid 0001 port P2
         controller pfc1 swid 0001 port P1 }
  boundary b2 {
    link controller hvc1 swid 0002 port P2
         controller pfc1 swid 0001 port P2 }
  boundary b3 {
    link controller hvc1 swid 0002 port P1
         controller pfc1 swid 0003 port P1 }
  boundary b4 {
    link controller hvc1 swid 0003 port P2
         controller pfc1 swid 0003 port P1 }
}
```

FIG. 10

VIRTUAL NETWORK CONFIGURATION INFORMATION (SECOND LAYER VTN1)

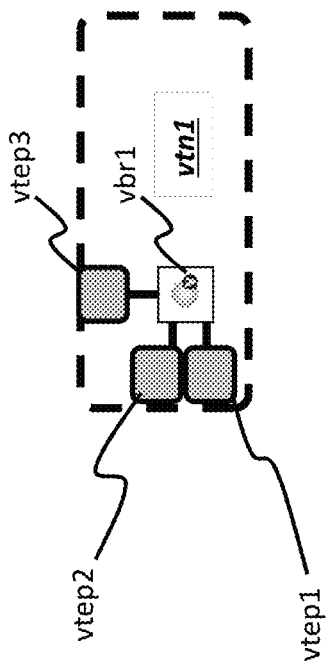

```
vtn vtn1 {
vtep vtep1 controller hvc1 {
  interface if1 }
vtep vtep2 controller hvc1 {
  interface if1 }
vtep vtep3 controller hvc1 {
  interface if1 }
vbridge vbr1 controller pfc1 {
  interface if1
  interface if2
  interface if3 }
vlink vlink1 vnode vtep1 interface if1
  vnode vbr1 interface if1 {
  link-map b1 vlan-id 10 }
vlink vlink2 vnode vtep2 interface if1
  vnode vbr1 interface if2 {
  link-map b2 vlan-id 10 }
vlink vlink3 vnode vtep3 interface if1
  vnode vbr1 interface if3 {
  link-map b3 vlan-id 10 } }
```

FIG. 11

VIRTUAL NETWORK CONFIGURATION INFORMATION (FIRST LAYER VTN1-A)

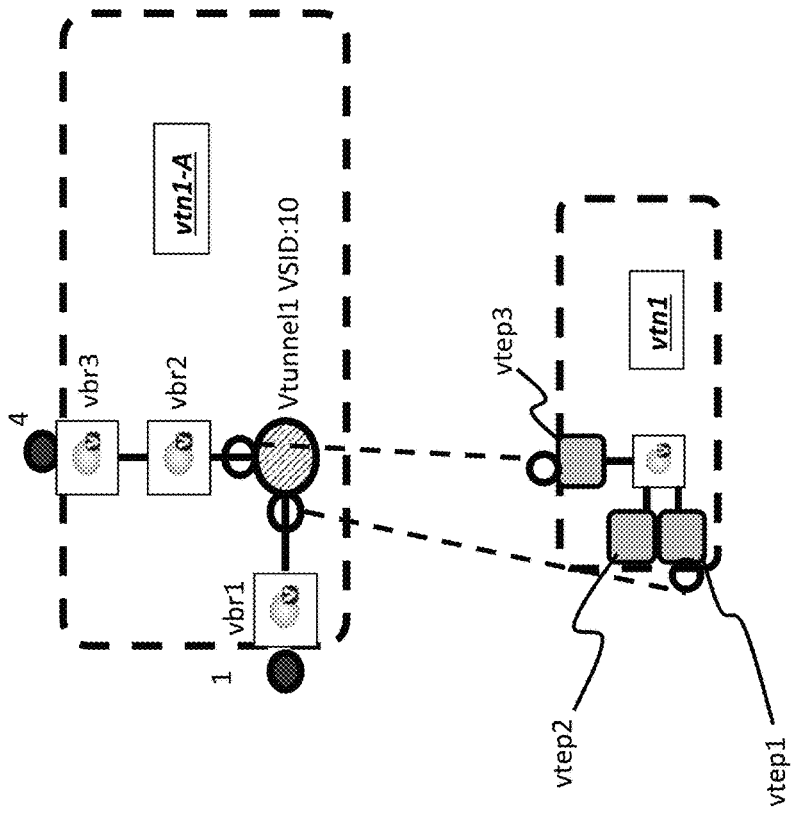

```
vtn vtn1-A {
  vbridge vbr1 controller hvc1 {
    interface if1 {
      port-map swid 0001 port-name P1 untagged }
    interface if2 }
  vtunnel vtunnel1 vsid 10 {
    interface if1 {
      tep-map vtn vtn1 vtep vtep1 }
    interface if2 {
      tep-map vtn vtn1 vtep vtep3 } }
  vbridge vbr2 controller hvc1 {
    interface if1
    interface if2 }
  vbridge vbr3 controller pfc1 {
    interface if1
    interface if2 {
      port-map swid 0004 port-name P4 interface if2
      vnode vtunnel1 interface if1
  vlink vlink2 vnode vtunnel1 interface if2
      vnode vbr2 interface if1
  vlink vlink3 vnode vbr2 interface if2
      vnode vbr3 interface if1 {
        link-map b4 vlan-id 30 } }
```

FIG. 12

VIRTUAL NETWORK CONFIGURATION INFORMATION (FIRST LAYER VTN1-B)

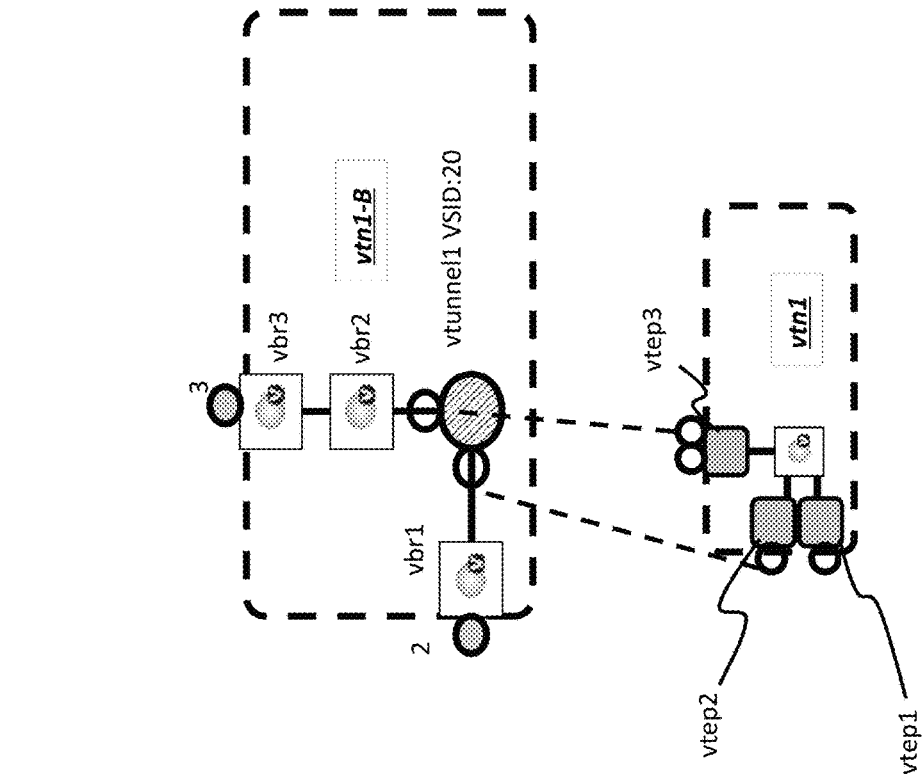

```
vtn vtn1-B {
 vbridge vbr1 controller hvc1 {
  interface if1 {
   port-map swid 0002 port-name P1 untagged }
  interface if2 } }
 vtunnel vtunnel1 vsid 20 {
  interface if1 {
   tep-map vtn vtn1 vtep vtep2 }
  interface if2 {
   tep-map vtn vtn1 vtep vtep3 } }
 vbridge vbr2 controller hvc1 {
  interface if1
  interface if2 }
 vbridge vbr3 controller pfc1 {
  interface if1
  interface if2 {
   port-map swid 0003 port-name P2 vlan-id 40 tagged} }
 vlink vlink1 vnode vbr1 interface if2
  vnode vtunnel1 interface if1
 vlink vlink2 vnode vtunnel1 interface if2
  vnode vbr2 interface if1
 vlink vlink3 vnode vbr2 interface if2
  vnode vbr3 interface if1 {
   link-map b4 vlan-id 40 } } }
```

COMMUNICATION SYSTEM, VIRTUAL NETWORK MANAGEMENT APPARATUS, VIRTUAL NETWORK MANAGEMENT METHOD AND PROGRAM

DESCRIPTION OF RELATED APPLICATION

The present application asserts priority rights based on JP Patent Application 2012-223123 filed in Japan on Oct. 5, 2012, the total contents thereof being incorporated by reference into the present Application.

FIELD

This invention relates to a communication system, an apparatus and a method for management of a virtual network, and a program. In particular, it relates to a communication system, an apparatus and a method for management of a virtual network system, and a program, providing a virtual network having a plurality of layers.

BACKGROUND

Recently, a technique known as OpenFlow has been proposed, see Non-Patent Literatures 1, 2. The OpenFlow comprehends communication as an end-to-end flow and manages path control, recovery from malfunctions, load balancing and optimization from one flow to another. An OpenFlow switch, specified in Non-Patent Literature 2, includes a secure channel over which to communicate with an OpenFlow Controller, and operates in accordance with a flow table an addition to or a rewriting in which is instructed as necessary from the OpenFlow Controller. In the flow table, a set of match conditions (Match Fields) for matching against a packet header, flow statistics information (Counters) and instructions that define the processing contents (Instructions) is defined from one flow to the next. See '4.1 Flow Table' of Non-Patent Literature 2.

On reception of a packet, the OpenFlow switch searches from the flow table an entry having the match condition conforming to the header information of the received packet. See '4.3 Match Fields' of Non-Patent Literature 2. If, as a result of the search, the entry matching the received packet is found, the OpenFlow switch updates the flow statistics information (Counters), at the same time as it executes processing contents stated in an instruction field of the matching entry, such as transmission at an identified port, flooding or dropping. If conversely no entry matching the received packet is found, the OpenFlow switch sends an entry setting request, that is, a request for getting the control information to process the received packet (Packet-In message), to the OpenFlow Controller over the secure channel. The OpenFlow switch receives the flow entry, in which processing contents are stated, and updates the flow table. In this manner, the OpenFlow switch forwards the packet, using the entry, stored in the flow table, as the control information.

It is stated in Example 2 on page 5 of Non-Patent Literature 1 that a virtual network such as VLAN (Virtual Local Area Network) can be provided using a scheme of the OpenFlow described above. It is also stated that the traffic of each user is specified by a port of an OpenFlow switch or by a MAC (Media Access Control) address and that the traffic is tagged with an appropriate VLAN ID by the OpenFlow switch. It is further stated that user authentication is managed by a controller and that the user's location is to be taken into account in tagging the traffic with the VLAN tag.

In Patent Literature 1, there is disclosed a network management system in which a certain user is prevented from seeing the content set by another user or operation data for processing performed by such another user. The network management system according to this Patent Literature includes a resource information repository that prepares and stores virtual network device information objects in terms of the network devices shared or in terms of users sharing the network devices as units. The network management system also includes a virtual resource information accessing means accepting and retrieving a variety of requests made from a terminal to the virtual network devices, and a shared resource information accessing means retrieving the shared network device information objects corresponding to the retrieved objects. It is stated that, by such configuration, a virtual network device that becomes a subset of the shared network devices is virtually constructed for each user and that a certain user may not be see the content set by another user or operation data on the processing performed by such another user.

Patent Literature 1:
JP Patent Kokai Publication No. JP2005-203984A
Non-Patent Literature 1:
Nick McKeown and seven others: "OpenFlow: Enabling Innovation in Campus Networks", [online], [searched on August 16 Heisei24 (2012)], Internet <URL:http://www.openflow.org/documents/openflow-wp-latest.pdf>
Non-Patent Literature 2:
"OpenFlow Switch Specification", Version 1.1.0 Implemented (Wire Protocol OxO2), [online], [searched on August 16 Heisei24 (2012)], Internet <URL:https://www.openflow.org/documents/openflow-spec-v1.1.0.pdf>

SUMMARY

The following analysis is by the present invention. The flow control technique, represented by the above mentioned OpenFlow, uses flow-based control to allow each of a plurality of users to use a virtual dedicated network in a sharing fashion. It is unnecessary for each user to manage an actual physical configuration. Rather, it is simpler and more amenable to real state of things that each user manages a virtual network including a virtual node(s) implemented by the behavior of a physical switch(es).

However, if the network is a large-scale one, a single control device equivalent to the above mentioned OpenFlow controller would not be sufficient and a plurality of control devices would have to be run in operation in concert in order to constitute a virtual network. The number of the virtual nodes would then be increased to complicate the network configuration.

Among virtual network administrators, there are those (non-tenant administrators) who are interested in low level network configurations or traffics as well and those (tenant administrators) who are interested in access control among individual hosts but not in the low level network configurations or traffics. Although it is possible to change the degree of network abstraction from one administrator to another, there persists a problem that simply changing the degree of abstraction does not necessarily bring about a situation that is more susceptible to management for each individual administrator.

Therefore, there is a need in the art to provide a communication system, an apparatus and a method for management of a virtual network system, and a program, which will contribute to improving the ease in construction or management of a virtual network.

According to a first aspect of the present invention, there is provided a communication system. The communication system comprises a network configuration memory that stores network configuration information of a first layer in which an area of the first layer whose low level configuration is desired to be concealed is represented by a preset symbol and that also stores network configuration information of a second layer showing the area represented by the preset symbol. Further, the communication system comprises a network configuration management section that allows a first user to manage a network of the first layer using the network configuration information of the first layer and that also allows a second user to manage a network of the second layer using at least the network configuration information of the second layer.

According to a second aspect of the present invention, there is provided a virtual network management apparatus. The virtual network management apparatus comprises a network configuration memory that stores network configuration information of a first layer in which an area of the first layer whose low level configuration is desired to be concealed is represented by a preset symbol and that also stores network configuration information of a second layer showing the area represented by the preset symbol. Further, the virtual network management apparatus comprises a network configuration management section that allows a first user to manage a network of the first layer using the network configuration information of the first layer and that also allows a second user to manage a network of the second layer using at least the network configuration information of the second layer.

According to a third aspect of the present invention, there is provided a method for management of a virtual network including a network configuration memory that stores network configuration information of a first layer in which an area of the first layer whose low level configuration is desired to be concealed is represented by a preset symbol and that also stores network configuration information of a second layer showing the area represented by the preset symbol. The method comprises accepting an operation on a network of the first layer made by a first user with the use of the network configuration information of the first layer. Further, the method comprises accepting an operation on a network of the second layer made by a second user with the use of at least the network configuration information of the second layer. The present method is bound up with a particular machine which is a virtual network management device that manages a virtual network.

According to a fourth aspect of the present invention, there is provided a program for a computer arranged in a virtual network including a network configuration memory that stores network configuration information of a first layer in which an area of the first layer whose low level configuration is desired to be concealed is represented by a preset symbol and that also stores network configuration information of a second layer showing the area represented by the preset symbol. The program causes the computer to execute accepting an operation on a network of the first layer made by a first user with the use of the network configuration information of the first layer. Further, the program causes the computer to execute accepting an operation on a network of the second layer made by a second user with the use of at least the network configuration information of the second layer. The present program can be recorded on a computer-readable, viz., non-transient, recording medium. That is, the present invention may be implemented as a computer program product.

The present invention provides the following advantage, but not restricted thereto. According to the present invention, it is possible to contribute to improving the ease in construction or management of the virtual network.

BRIEF DESCRIPTION OF THE DRAWINGS

FIG. 9 is a tabulated view showing the configuration information of domains and boundaries in the network configuration of FIG. 8.

FIG. 10 is a tabulated view showing the configuration information of a virtual network of a second layer constituted by switches #1 and #2 of FIG. 8, with a schematic view showing the virtual network.

FIG. 11 is a tabulated view showing the configuration information of a first layer in which a virtual network of the second layer of FIG. 10 is arranged as a virtual tunnel, with a schematic view showing the virtual network placed as a virtual tunnel in the first layer.

FIG. 12 is a tabulated view showing modified configuration information of a first layer in which a virtual network of the second layer of FIG. 10 is arranged as a virtual tunnel, with a schematic view showing the virtual network placed as a virtual tunnel in the first layer.

PREFERRED MODES

In the present disclosure, there are various possible modes, which include the following, but not restricted thereto. Initially, a summary of a preferred mode of the present invention will be described with reference to the drawings. It is noted that symbols are entered in the following summary merely as examples to assist in understanding and are not intended to limit the present invention to the mode illustrated.

Figure 1:
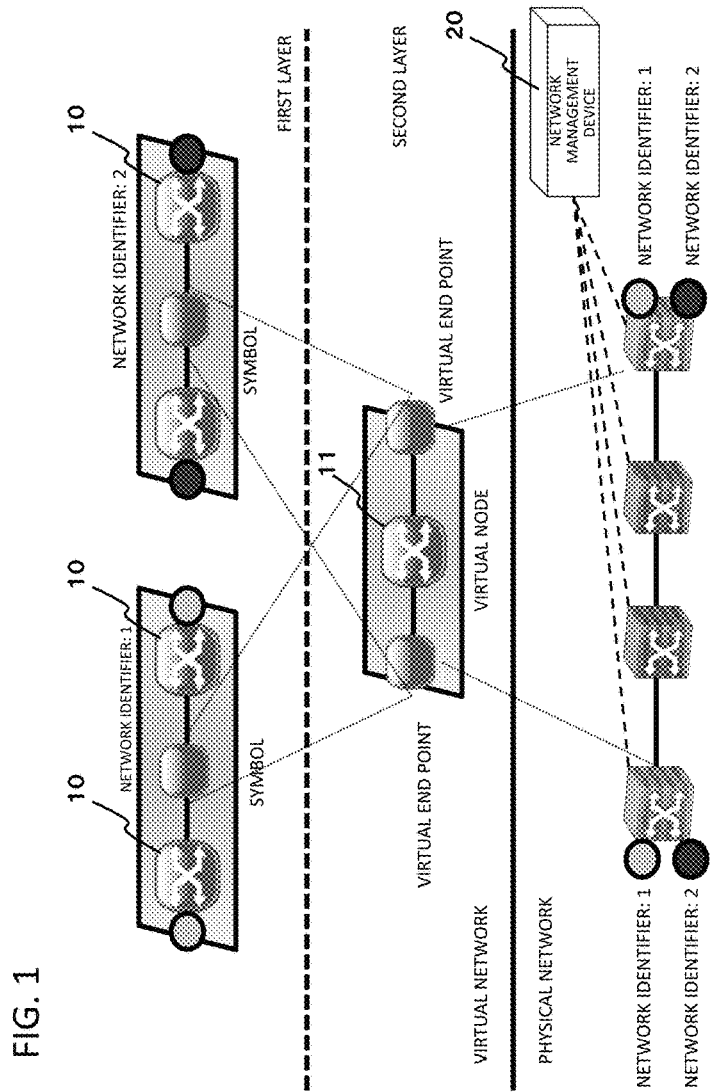
FIG. 1 is a schematic view showing a configuration of an exemplary embodiment of the present invention.
Figure 2:
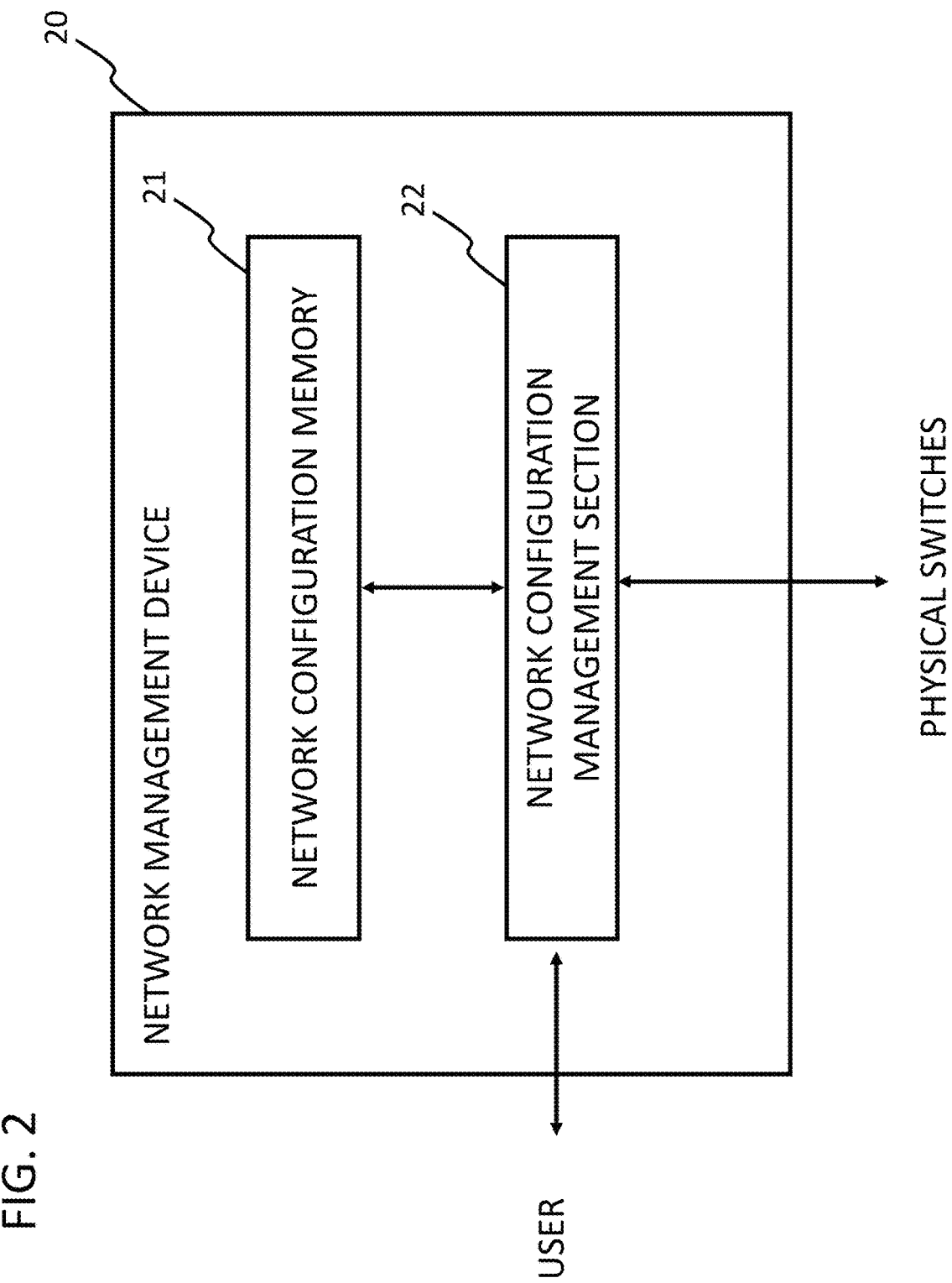
FIG. 2 is a block diagram showing a configuration of a network management device according to the exemplary embodiment.

In a preferred mode, the present invention may be implemented by a communication system including a network management device 20 composed of a network configuration memory (21 of FIG. 2) and a network configuration management section (22 of FIG. 2). The network configuration memory stores the network configuration information of a first layer in which an area of the first layer whose low level configuration is desired to be concealed is represented by a preset symbol and that also stores the network configuration information of a second layer showing the area represented by the preset symbol. The network configuration management section allows a first user to manage the network of the first layer using the network configuration information of the first layer and that also allows a second user to manage the network of the second layer using at least the network configuration information of the second layer (see FIG. 1). It is noted that the content for processing, accepted by the network configuration management section (22 of FIG. 2) from the user, is forwarded to a control device, not shown, for controlling the individual switches.

In an example of FIG. 1, a user to whom a network identifier: 1 is allocated and another user to whom a network identifier: 2 is allocated share a virtual network constituted from one and the same physical network. The network management device 20 configures a virtual node 11, using a plurality of physical switches, and places the so configured virtual node in a network of a second layer. In a first layer, the network of the second layer is represented by a symbol. Hence, the users, to whom are allocated the network identifier: 1 and the network identifier: 2 are able to manage and use their respective dedicated networks without being concerned about the configuration of the second layer.

On the other hand, the second layer is managed by a third user who manages the network of the second layer.

In this manner, ease in construction as well as management of the virtual network may be enhanced. The reason is that a virtual network is split into a plurality of layers and that, in an upper layer, an area whose low level configuration is desired to be concealed is represented by a symbol.

First Exemplary Embodiment

Figure 3:
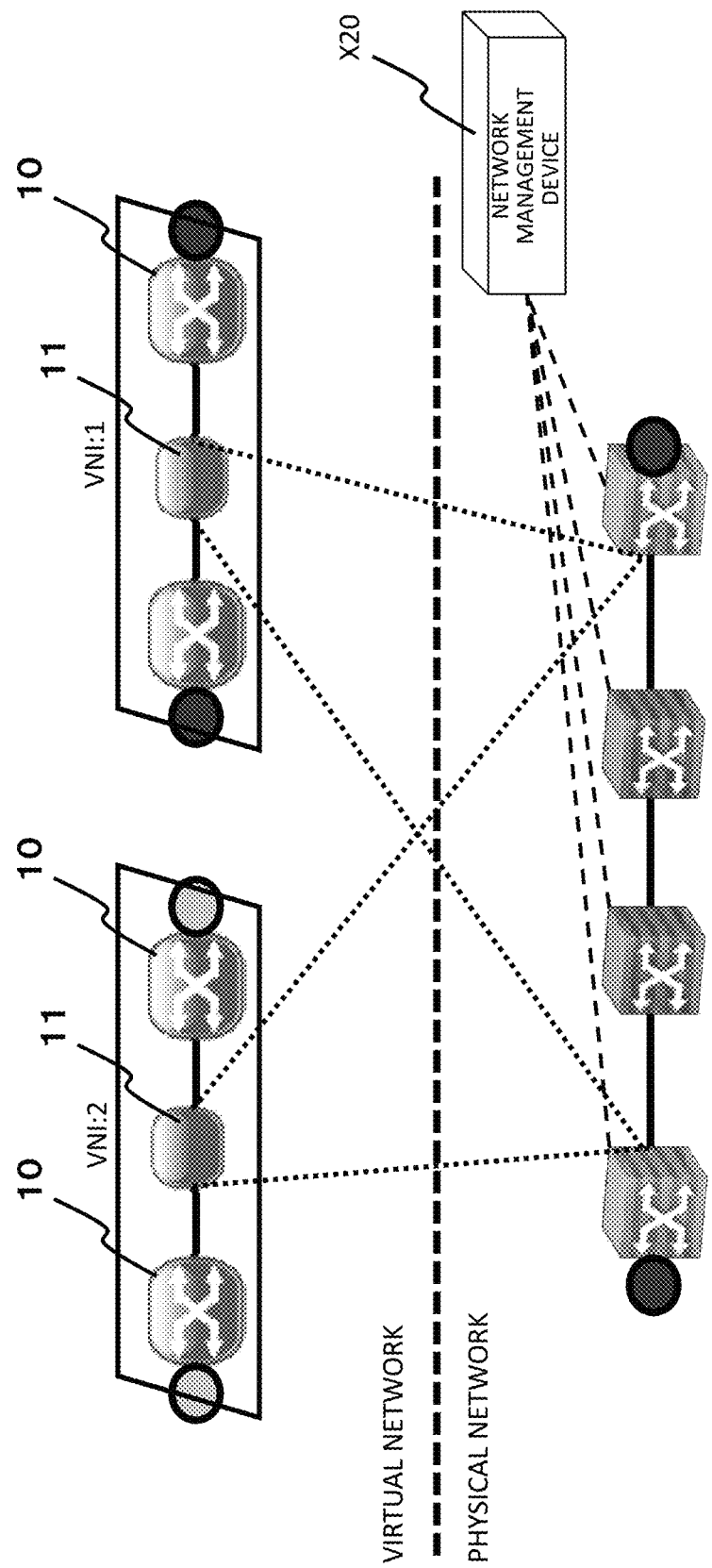
FIG. 3 is a schematic view to be used as reference for understanding a first exemplary embodiment of the present invention.

A first exemplary embodiment of the present invention will now be described in detail with reference to the drawings. FIG. 3 is a schematic view which may be referenced in understanding the first exemplary embodiment. Referring to FIG. 3, there are shown a physical network made up of four physical switches and a single-layer virtual network including virtual nodes 10, 11. In this situation, a network management device X20 is able to exercise flow-based control to permit a plurality of users, namely a user with VN1=1 and another user with VN1=2, to use the virtual network. By the way, VN1 is an acronym of VXLAN Network Identifier and VXLAN an acronym of Virtual Extensible Local Area Network.

Figure 4:
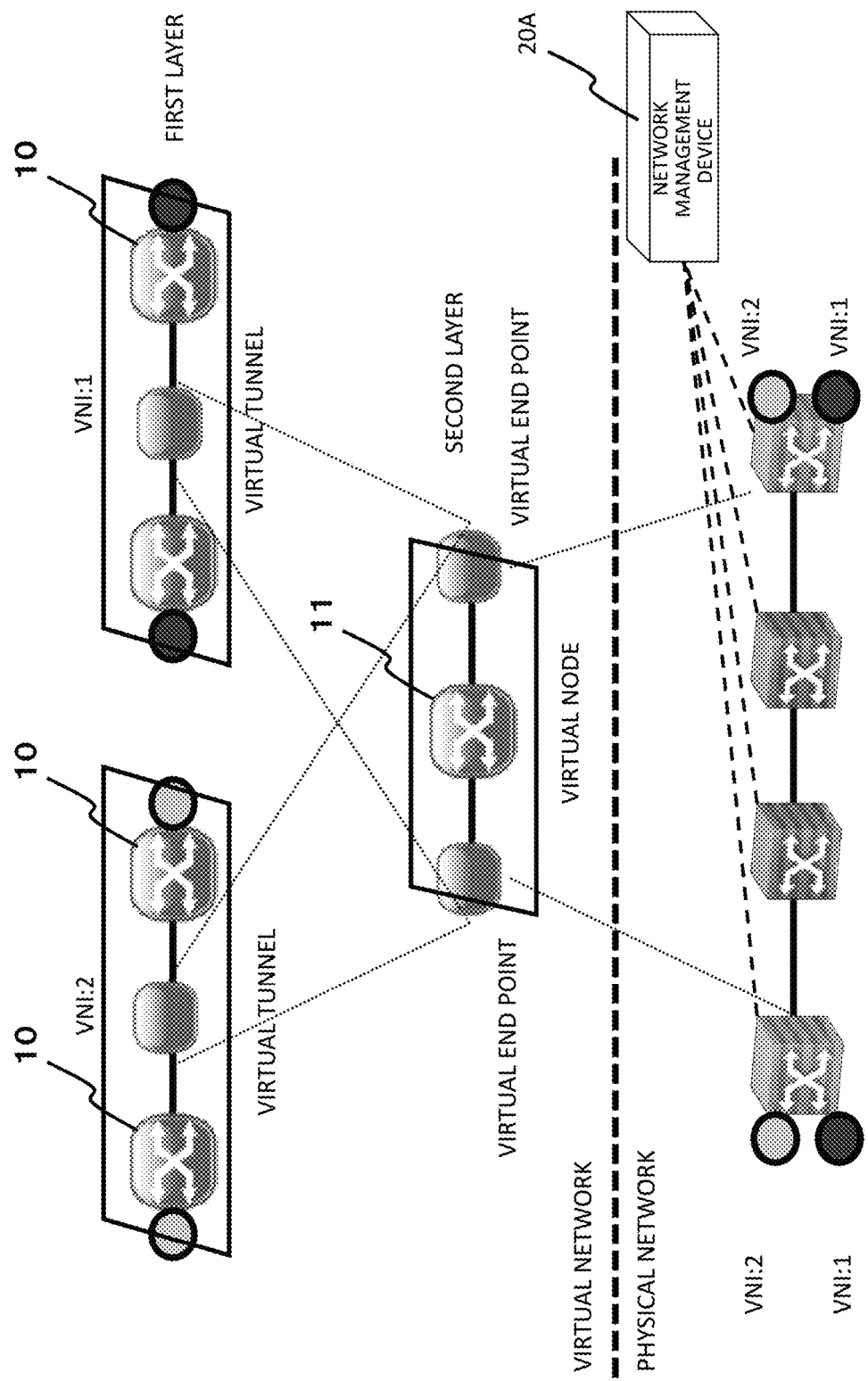
FIG. 4 is a schematic view showing a configuration of a virtual network of the first exemplary embodiment of the present invention.

However, the single-layer virtual network of FIG. 3 suffers a problem that, if a virtual node 11 is presented to a certain user, for example, a user with the VNI=1, and the user is allowed to change its setting, such change affects a network of a user with the VN1=2. Hence, in the subject exemplary embodiment, the virtual node 11 of the virtual network of FIG. 3 is placed in a second layer with virtual end points, as shown in FIG. 4, and network slicing is made by VXLAN in the first layer. Moreover, in the first layer, the above mentioned virtual node of the network of the second layer is represented by a symbol 'virtual tunnel' that has interfaces mapped to the virtual end points of the second layer.

Also, in the subject exemplary embodiment, flow control that takes the VNIs into consideration may be exercised in the second layer as well.

Figure 5:
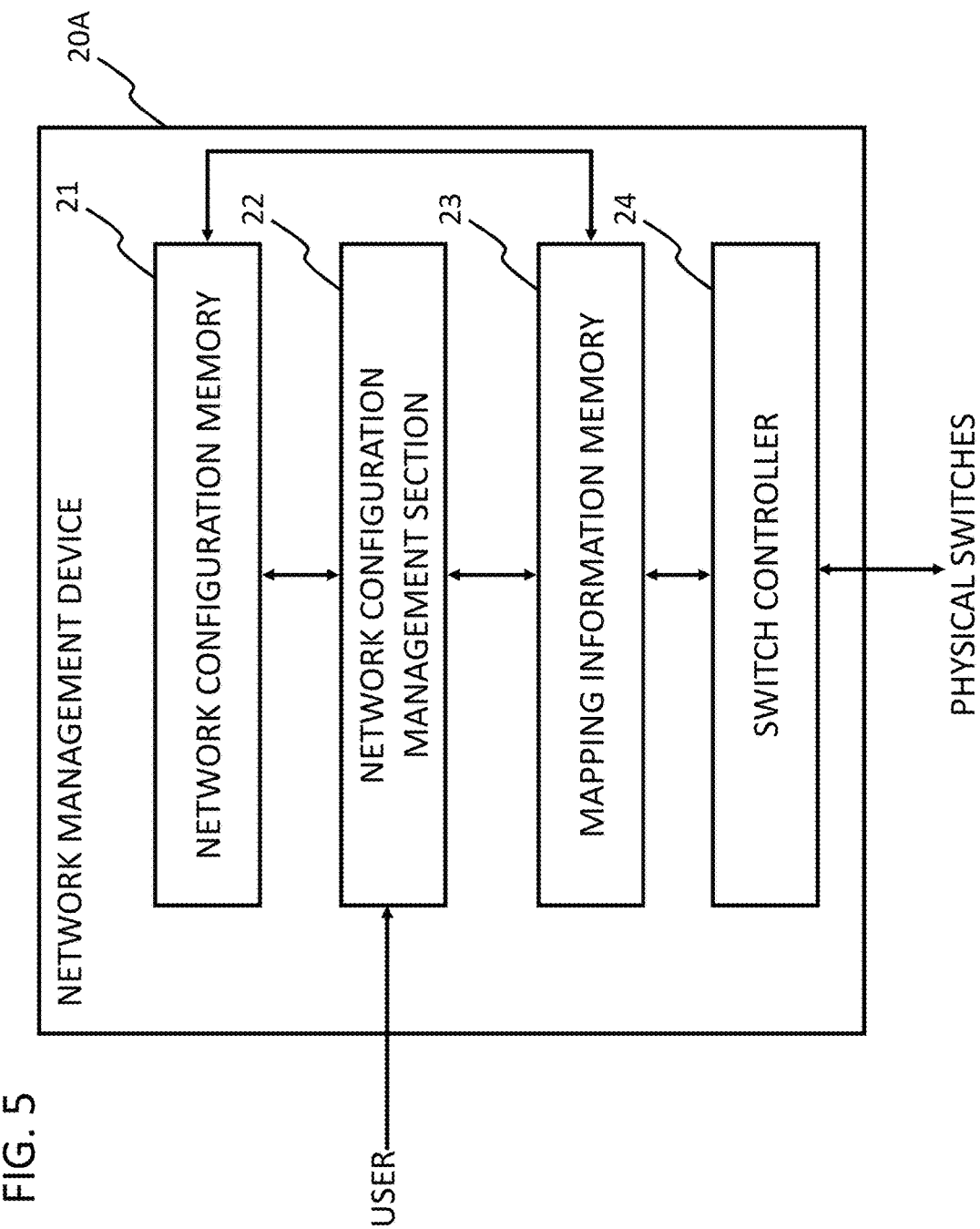
FIG. 5 is a block diagram showing a configuration of a network management device according to the first exemplary embodiment of the present invention.

A user or a user group in the second layer may be identified by imparting an identifier for the second layer to e.g., a header of a user packet. FIG. 5 shows a configuration of a network management device 20A of the first exemplary embodiment of the present invention. The network management device of the subject exemplary embodiment differs from the network management device shown in FIG. 2 in such points that there are provided a mapping information memory 23 that stores the relation of correspondence between the user identifiers of the first and second layers and a switch controller 24 that causes the switch(es) on the physical network to perform the processing of writing the user identifier in a packet header based on this relation of correspondence.

Figure 6:
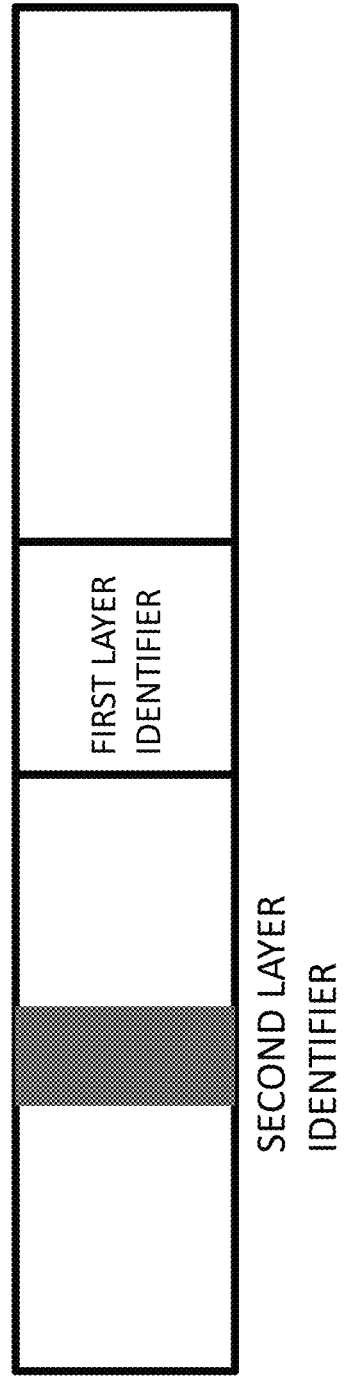
FIG. 6 is a diagrammatic view showing example storage locations of an identifier for the first layer and an identifier for the second layer.

FIG. 6 shows an example storage location of the identifier for the second layer. In the example of FIG. 6, an identifier for the second layer is stored at a preset location of an additional header of VXLAN etc. This enables flow identification making use of an identifier for the second layer as well.

Figure 7:
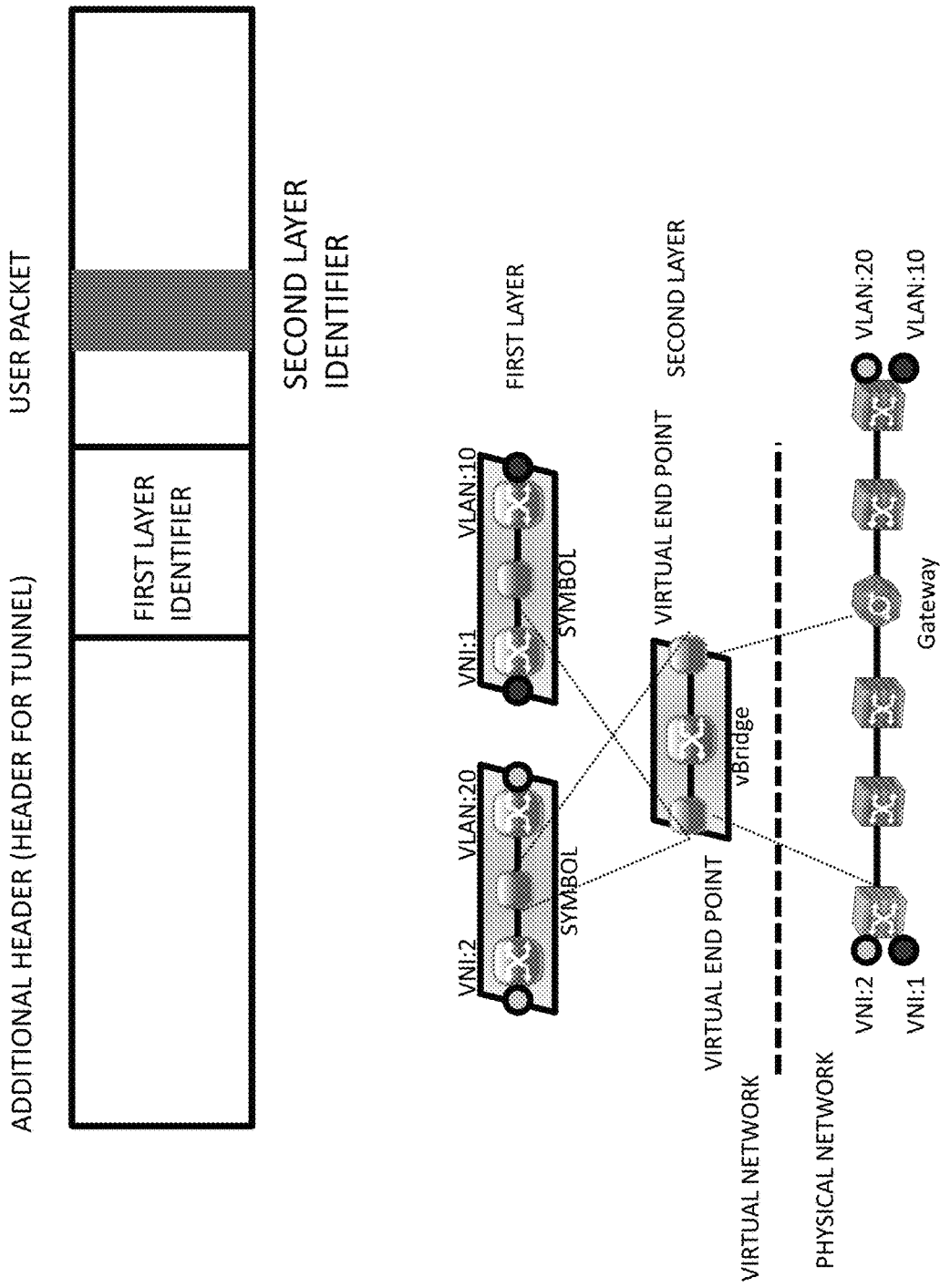
FIG. 7 is a diagrammatic view showing modified example storage locations of an identifier for the first layer and an identifier for the second layer.

FIG. 7 shows another example of the storage location for the identifier for the second layer. The example of FIG. 7 is such a one in which the identifier for the second layer is stored at a preset location of a header of an upper layer protocol on an inner side of the additional header of VXLAN etc. By so doing, even in such a case where the additional header is stripped off by a gateway and a resulting packet is forwarded to an outer address, as shown in a lower part of FIG. 7, it is possible for the outer network node to exercise flow control that takes the VNIs into account.

Second Exemplary Embodiment

Figure 8:
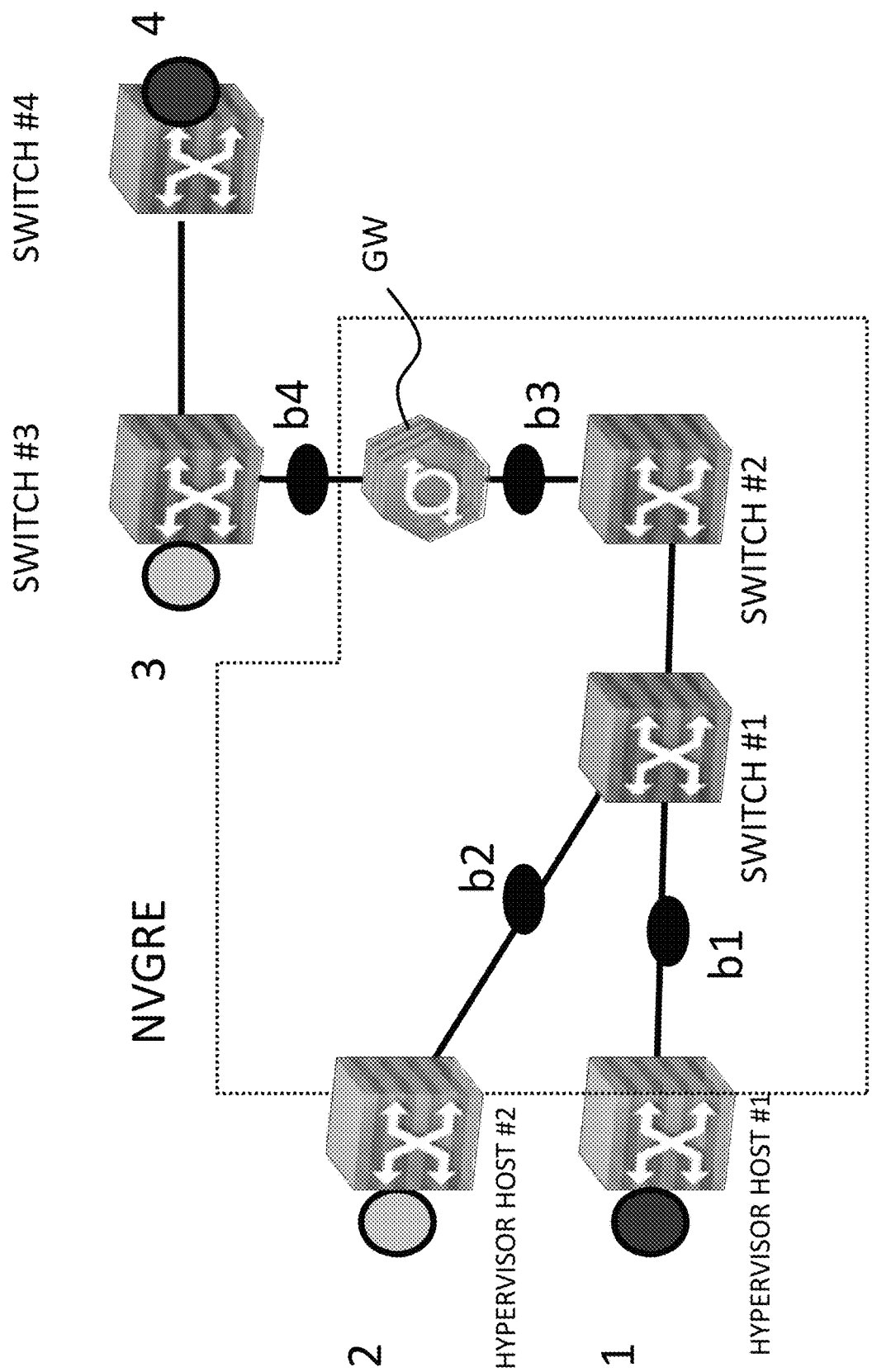
FIG. 8 is a schematic view showing a physical configuration of a virtual network according to a second exemplary embodiment of the present invention.

A second exemplary embodiment of the present invention will now be explained in detail with reference to the drawings. FIG. 8 illustrates a physical configuration of a virtual network of the second exemplary embodiment of the present invention. Since the subject exemplary embodiment may be implemented by a configuration similar to that of the first exemplary embodiment, the following description is centered about the points of difference from the above described first exemplary embodiment.

FIG. 8 shows a configuration in which switches #1, #2 controlled to perform slicing by a VSID (Virtual Subset iDentifier) in accordance with NVGRE (Network Virtualization using Generic Routing Encapsulation) are connected via a gateway GW to switches #3, #4 that are outside the NVGRE. To the switch #1, there are connected hypervisor hosts #1, #2 implemented by a hypervisor type server virtualization application. In the drawing, b1 through to b4 denote boundaries of domains configured by a controller.

FIG. 9 shows an example of the configuration information of the domains and the boundaries in the network configuration of FIG. 8. In the example of FIG. 9, five domains and the boundaries b1 through to b4 lying at border lines thereof are defined by the combinations of switches and ports, as seen from FIG. 8.

FIG. 10 shows an example of the configuration information of a virtual network of the second layer composed of the switches #1, #2 of FIG. 8. Referring to FIG. 10, a virtual bridge vbr1 constituted by the switches #1, #2, interfaces of the virtual bridge and virtual links defined by tunnel end points (vteps) are defined. The virtual links are mapped to the boundaries b1 through to b3 of FIG. 8 and '10' is donated to each of the links as vlan-id.

FIG. 11 shows an example of the configuration information of the first layer in which the virtual network of the second layer of FIG. 10 is placed as a virtual tunnel. In FIG. 11, the virtual network, shown in FIG. 10, is represented by a virtual tunnel vtunnel1 having the VSID: 10 and is connected to virtual bridges vbr1, vbr2 of the first layer. The virtual tunnel vtunnel1 has its interfaces mapped to virtual tunnel end points vtep1, vtep3 of FIG. 10. Likewise, end points 1, 4, connecting to interfaces of virtual bridges vbr1, vbr3 of the network of the first layer, are mapped to a port of the hypervisor host #1 and to a port of the switch #4.

FIG. 12 shows another example of the configuration information of the first layer in which the virtual network of the second layer shown in FIG. 10 is placed as a virtual tunnel. Referring to FIG. 12, the virtual network, shown in FIG. 10, is represented by a virtual tunnel vtunnel1 having a VSDI: 20, and is connected to the virtual bridges vbr1, vbr2 of the first layer. The virtual tunnel vtunnel1 has its interfaces mapped to virtual tunnel end points vtep2, vtep3 of FIG. 10. Likewise, end points 2, 3, connecting to interfaces of the virtual bridges vbr1, vbr3 of the network of the first layer, are mapped to a port of the hypervisor host #2 and to a port of the switch #3.

Figure 13:
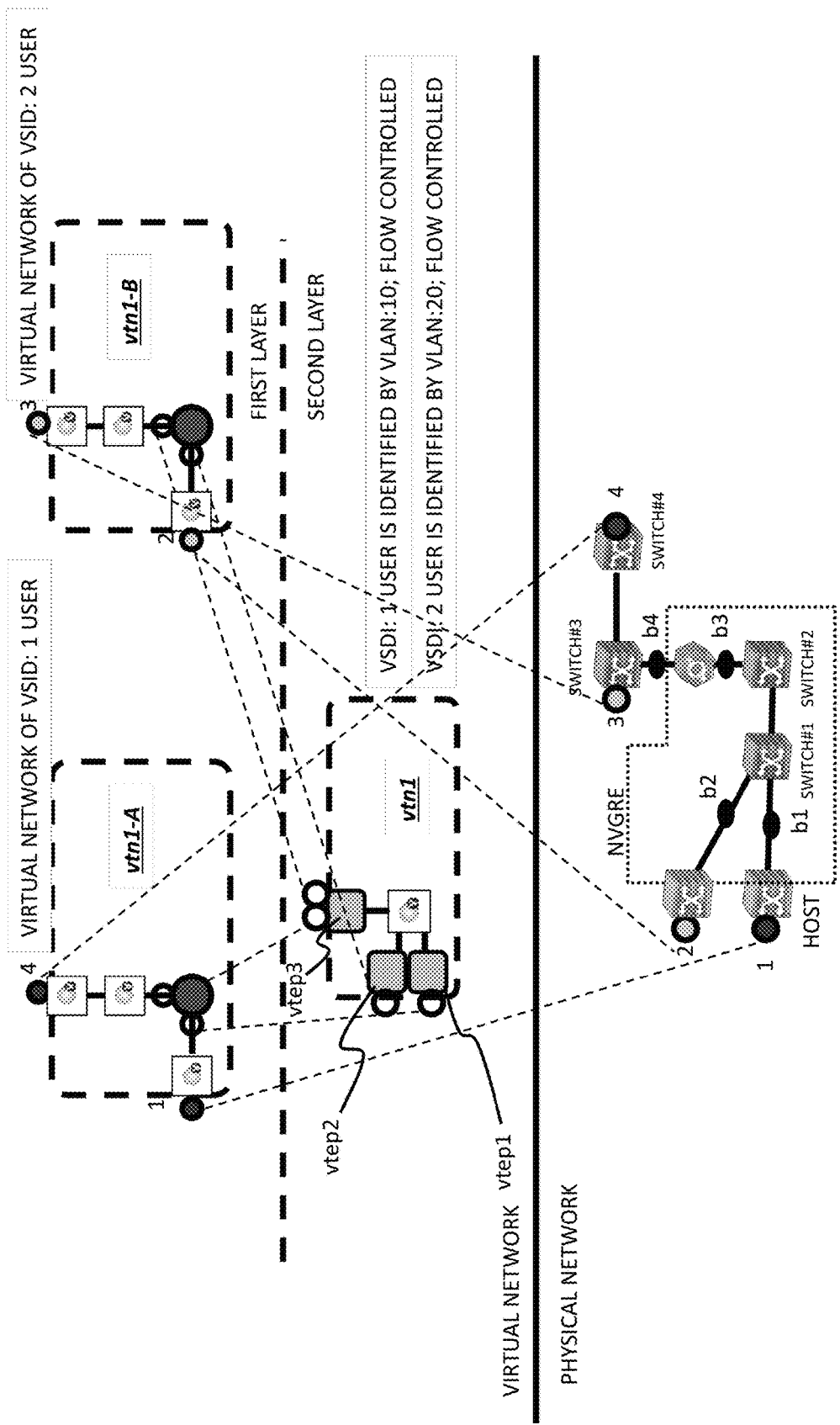
FIG. 13 is a schematic expanded view of a virtual network constructed from the network configuration of FIG. 8.

As a result of the above, the physical network is ultimately expanded, as shown in FIG. 13, into a virtual network having two layers whose corresponding elements are mapped. The user with the VSID: 1 is able to set and manage a network on the basis of a virtual network vtn1-A that is simplified by the virtual tunnel. Likewise, the user with the VSID: 2 is able to set and manage a network on the basis of a virtual network vtn1-B that is simplified by the virtual tunnel. Moreover, in setting or managing the second layer, flow control etc. by VLAN ID may be exercised based on the virtual network vtn1 of the second layer.

Third Exemplary Embodiment

Figure 14:
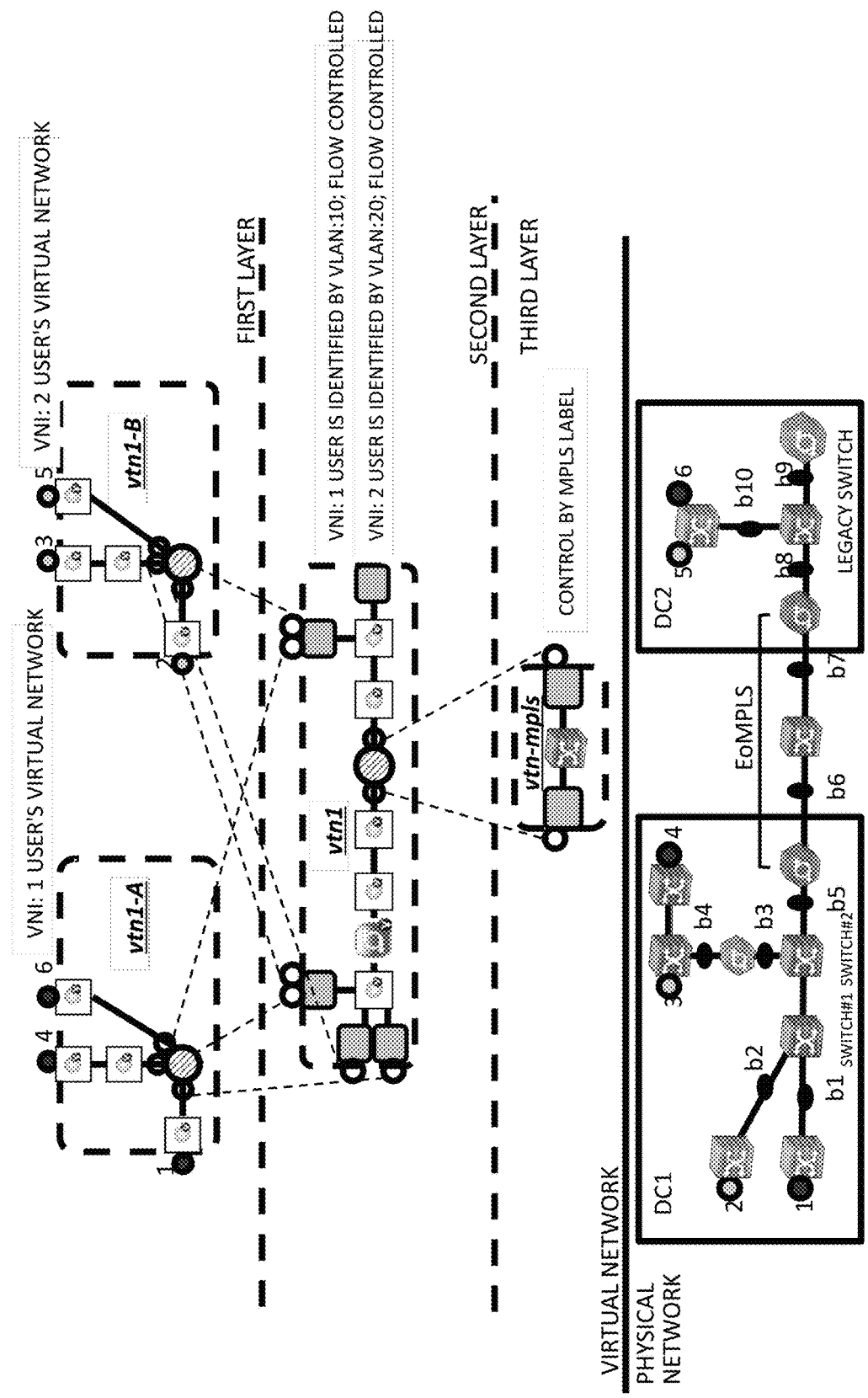
FIG. 14 is an expanded schematic view of a virtual network according to a third exemplary embodiment of the present invention.

A third exemplary embodiment of the present invention will now be explained in detail with reference to the drawings. FIG. 14 illustrates a configuration of a virtual network of the third exemplary embodiment of the present invention. Since the subject exemplary embodiment may be implemented by a configuration and the manner of configuration about similar to those of the second exemplary embodiment, the following description is centered about the points of difference from the above described second exemplary embodiment.

In an example of FIG. 14, a physical network interconnects two data centers via EoMPLS (Ethernet (registered trademark) over MPLS). The EoMPLS (Ethernet (registered trademark) over MPLS) part is represented, in a virtual network, by a network of a third layer including a virtual switch that exercises control by an MPLS label. In the configuration of a second layer, higher in level than the third level, the network of the third layer is represented by a virtual tunnel, and a virtual bridge or a virtual router is arranged from one domain to another. In the configuration of a first layer, higher in level than the second layer, the network of the second layer is represented by a virtual tunnel and a virtual router is arranged from one domain to another.

According to the present invention, described above, it is possible to simplify the configuration of a virtual network, run in operation by an end user, even in a complex configuration comprised of an interconnection of a plurality of data centers. The reason is that, even if there are a large number of domains and it is necessary to provide a corresponding large number of virtual nodes, these may be arranged as virtual tunnels that do not have to be managed by the end users.

Fourth Exemplary Embodiment

Figure 15:
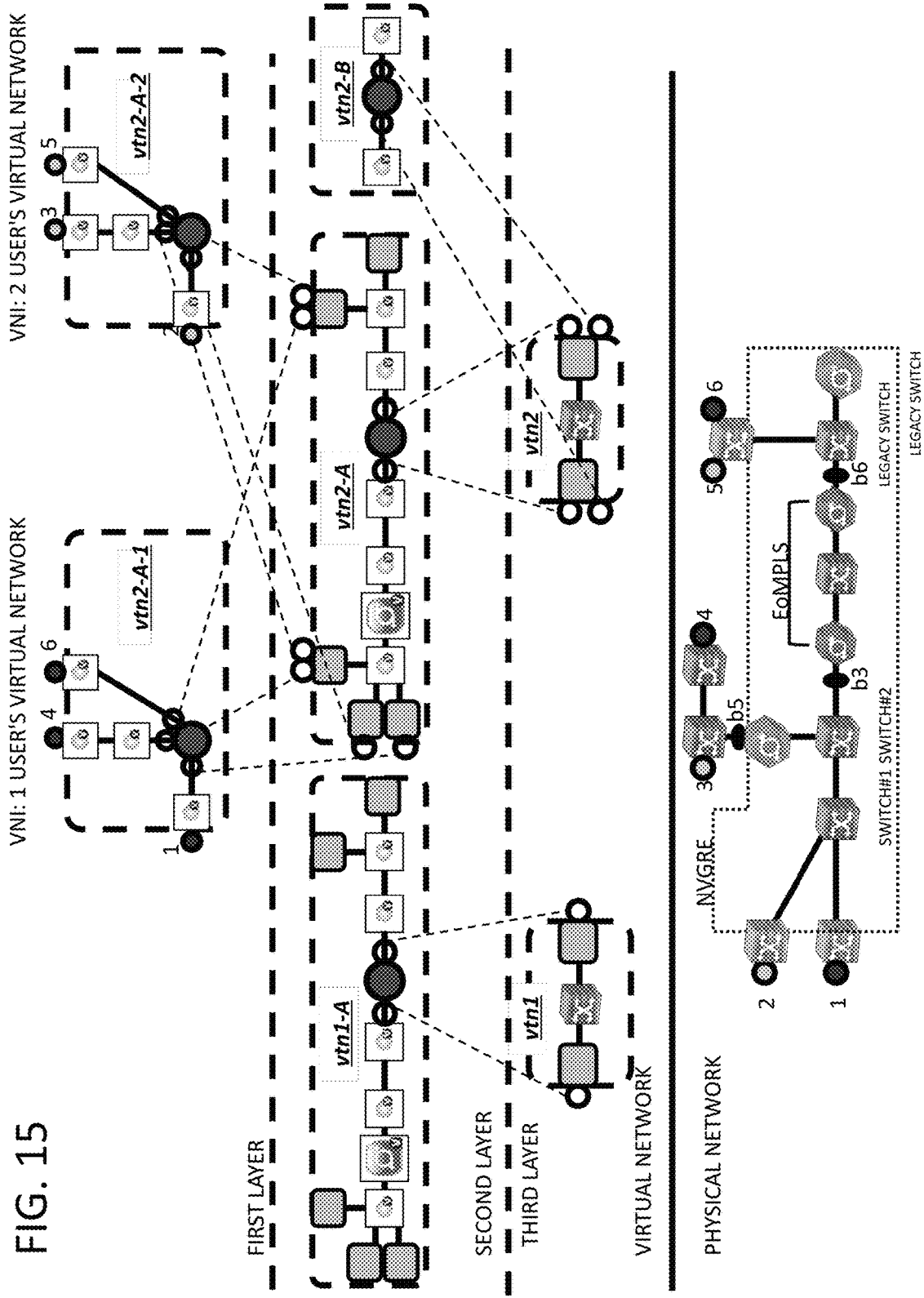
FIG. 15 is an expanded schematic view of a virtual network according to a fourth exemplary embodiment of the present invention.

A fourth exemplary embodiment of the present invention will now be explained in detail with reference to the drawings. FIG. 15 illustrates a configuration of a virtual network of the fourth exemplary embodiment of the present invention. Since the subject exemplary embodiment may be implemented by the configuration and the manner of configuration similar to those of the second and third exemplary embodiments, the following description is centered about the points of difference from these exemplary embodiments.

In the example of FIG. 15, slicing is performed in the first to third layers using a physical network including an EoMPLS network and a legacy switch. The virtual network, sliced in a lower layer, is represented as a virtual tunnel in an upper layer, and relevant ones of the virtual tunnel end points and interfaces are mapped one to another.

As described above, the present invention can be applied to such a case where slicing is made in a plurality of layers of, for example, MPLS, VLAN or NVGRE, so that, as in the above described exemplary embodiments, it is possible to simplify the configuration of the virtual network operated by the end user.

It should be noted that, while preferred exemplary embodiments of the present invention are described above, the present invention is not to be restricted to these particular modes, such that further changes, substitutions or adjustments may be made within the range not departing from the basic technical concept of the invention. For example, the configurations of the networks or elements are merely illustrative and are shown to assist in understanding but are not intended to limit the present invention to the mode illustrated.

Also, in the above described exemplary embodiments, it is presupposed that slicing is carried out using VXLAN or NVGRE in the upper layer. However, these are given only as examples and any other suitable system may be used. Moreover, it is presupposed that VLAN or MPLS is to be used in the lower layer as well. These are similarly shown only as examples and any other suitable system may be used.

In the above described exemplary embodiments, it is also presupposed that the network management device includes the network configuration memory and the network configuration management section. However, these may be arranged as separate devices, or may be implemented as respective functions of a control device controlling the physical switches.

Finally, certain preferred modes of the present invention will be summarized.

(Mode 1)

Reference is made to the communication node according to the first aspect.

(Mode 2)

The communication system according to mode 1, further comprising a mapping information memory that stores a relation of correspondence between an identifier for identifying a user in the first layer and another identifier for identifying a user in the second layer, wherein the both identifiers are used so as to perform management so that flow control can be exercised in both the first and second layers.

(Mode 3)

The communication system according to mode 2, further comprising a switch controller that causes a switch on a path to perform the processing of writing the identifier for identifying the user in the second layer in a header based on the identifier that identifies the user in the first layer and that is contained in a user packet.

(Mode 4)

The communication system according to mode 3, wherein, the identifier for identifying the user in the second layer is stored in a preset area of a header that stores the identifier of the first layer.

(Mode 5)

The communication system according to mode 3 or 4, wherein, the identifier for identifying the user in the second layer is stored in a preset area of a second header lying on an inner side of the header storing the identifier of the first layer.

(Mode 6)

The communication system according to any one of modes 1 to 5, wherein,
the network of the second layer showing the area represented by the symbol is associated with the network of the first layer in a one to multiple relation.

(Mode 7)

Reference is made to the virtual network management apparatus according to the second aspect.

(Mode 8)

The virtual network management apparatus according to mode 7, further comprising:
a mapping information memory that stores a relation of correspondence between an identifier for identifying a user in the first layer and another identifier for identifying another user in the second layer, and a network management section that performs management to exercise flow control in both the first and second layers using the both identifiers.

(Mode 9)

The virtual network management apparatus according to mode 8, further comprising
a switch controller that causes a switch on a path to perform a processing of writing the identifier for identifying the user in the second layer in a header based on the identifier that identifies the user in the first layer and that is contained in a user packet.

(Mode 10)

Reference is made to the method for management of the virtual network according to the third aspect.

(Mode 11)

Reference is made to the program according to the fourth aspect.

It is noted that the mode 7 can be expanded to the modes 4 to 6, as in the above mode 1, and that the modes 10, 11 can be expanded to the modes 2 to 6, as in the above mode 1.

The disclosures of the above mentioned Patent Literatures as well as non-Patent Literatures are to be incorporated herein by reference. The exemplary embodiments or Examples may be modified or adjusted within the concept of the total disclosures of the present invention, inclusive of claims, based on the fundamental technical concept of the invention. A wide variety of combinations or selections of elements herein disclosed (elements of claims, Examples and drawings) may be made within the context of the claims of the present invention. That is, the present invention may include a wide variety of changes or corrections that may occur to those skilled in the art in accordance with the total disclosures inclusive of the claims and the drawings as well as the technical concept of the invention. In particular, it should be understood that any optional numerical figures or sub-ranges contained in the ranges of numerical values set out herein ought to be construed to be specifically stated even in the absence of explicit statements.

10, 11 virtual nodes
20, 20A, X20 network management devices
21 network configuration memory
22 network configuration management section
23 mapping information memory
24 switch controller
b1 to b4 boundaries
vtep1 to vtep3 virtual tunnel end points
vbr1 to vbr3 virtual bridges
vtunnel1 virtual tunnel

What is claimed is:

1. A communication system, comprising:
   a network configuration memory that stores:
      network configuration information of a first layer in which an area of the first layer whose low level configuration is desired to be concealed is represented by a preset symbol; and
      network configuration information of a second layer showing the area represented by the preset symbol;
   a network configuration management section that allows:
      a first user to manage a network of the first layer using the network configuration information of the first layer; and
      a second user to manage a network of the second layer using at least the network configuration information of the second layer;
   a mapping information memory that stores a relation of correspondence between a first identifier for identifying a user in the first layer, and a second identifier for identifying a user in the second layer; and
   a switch controller that causes a switch on a path of a user packet to write the second identifier in a header of the user packet, based on the first identifier contained in the user packet.

2. The communication system according to claim 1, wherein, the second identifier is stored in a preset area of an additional header that stores an identifier of the first layer.

3. The communication system according to claim 2, wherein,
   the network of the second layer showing the area represented by the preset symbol is associated with the network of the first layer in a one to multiple relation.

4. The communication system according to claim 1, wherein, the second identifier is stored in a preset area of the header of the user packet.

5. The communication system according to claim 4, wherein,
   the network of the second layer showing the area represented by the preset symbol is associated with the network of the first layer in a one to multiple relation.

6. The communication system according to claim 1, wherein,
   the network of the second layer showing the area represented by the preset symbol is associated with the network of the first layer in a one to multiple relation.

7. A virtual network management apparatus comprising:
   a network configuration memory that stores:
      network configuration information of a first layer in which an area of the first layer whose low level configuration is desired to be concealed is represented by a preset symbol; and
network configuration information of a second layer showing the area represented by the preset symbol;
a network configuration management section that allows:
a first user to manage a network of the first layer using the network configuration information of the first layer; and
a second user to manage a network of the second layer using at least the network configuration information of the second layer;
a mapping information memory that stores a relation of correspondence between a first identifier for identifying a user in the first layer, and a second identifier for identifying a user in the second layer; and
a switch controller that causes a switch on a path of a user packet to write the second identifier in a header of the user packet, based on the first identifier contained in the user packet.

8. A method for management of a virtual network including a network configuration memory that stores network configuration information of a first layer in which an area of the first layer whose low level configuration is desired to be concealed is represented by a preset symbol, and that also stores network configuration information of a second layer showing the area represented by the preset symbol, the method comprising:
accepting an operation on a network of the first layer made by a first user with the use of the network configuration information of the first layer;
accepting an operation on a network of the second layer made by a second user with the use of at least the network configuration information of the second layer;
storing a relation of correspondence between a first identifier for identifying a user in the first layer, and a second identifier for identifying a user in the second layer; and
causing a switch on a path of a user packet to write the second identifier in a header of the user packet, based on the first identifier contained in the user packet.

9. The method according to claim 8, wherein:
the second identifier is stored in a preset area of an additional header that stores an identifier of the first layer.

10. The method according to claim 8, wherein:
the second identifier is stored in a preset area of the header of the user packet.

11. The method according to claim 8, wherein:
the network of the second layer showing the area represented by the preset symbol is associated with the network of the first layer in a one to multiple relation.

12. A non-transitory computer-readable recording medium storing a program that causes a computer, arranged in a virtual network including a network configuration memory that stores network configuration information of a first layer in which an area of the first layer whose low level configuration is desired to be concealed is represented by a preset symbol, and that also stores network configuration information of a second layer showing the area represented by the preset symbol, to execute a method, the method comprising:
accepting an operation on a network of the first layer made by a first user with the use of the network configuration information of the first layer;
accepting an operation on a network of the second layer made by a second user with the use of at least the network configuration information of the second layer;
storing a relation of correspondence between a first identifier for identifying a user in the first layer, and a second identifier for identifying a user in the second layer; and
causing a switch on a path of a user packet to write the second identifier in a header of the user packet, based on the first identifier contained in the user packet.

13. The non-transitory computer readable recording medium according to claim 12, wherein:
the second identifier is stored in a preset area of an additional header that stores an identifier of the first layer.

14. The non-transitory computer readable recording medium according to claim 12, wherein:
the second identifier is stored in a preset area of the header of the user packet.

15. The non-transitory computer readable recording medium according to claim 12, wherein:
the network of the second layer showing the area represented by the preset symbol is associated with the network of the first layer in a one to multiple relation.

* * * * *